United States Patent
Toda

Patent Number: 5,850,118
Date of Patent: Dec. 15, 1998

[54] ULTRASONIC TOUCH-POSITION SENSITIVE DEVICE

[76] Inventor: Kohji Toda, 1-49-18 Futaba, Yokosuka 239, Japan

[21] Appl. No.: 851,003

[22] Filed: May 5, 1997

[51] Int. Cl.$^6$ .................................................. H01L 41/08
[52] U.S. Cl. ................................... 310/313 R; 310/313 B
[58] Field of Search ........................... 310/313 R, 313 B, 310/313 D; 73/596, 597, 599, 617, 632, 643, 655, 23.2, 24.01; 333/150–155, 193–196

[56] References Cited

U.S. PATENT DOCUMENTS

| | | | |
|---|---|---|---|
| 5,679,998 | 10/1997 | Toda | 310/313 R |
| 5,723,934 | 3/1998 | Toda | 310/313 R |
| 5,767,608 | 6/1998 | Toda | 310/313 R |
| 5,771,206 | 6/1998 | Toda | 310/313 R |

Primary Examiner—Mark O. Budd

[57] ABSTRACT

An ultrasonic touch-position sensing device comprising a piezoelectric substrate, two surface acoustic wave transducing units X and Y, and a controlling system connected with the units X and Y. The unit X includes interdigital transducers $T_X$ and $R_X$, and the unit Y includes interdigital transducers $T_Y$ and $R_Y$ on the upper end surface of the substrate. When an electric signal is applied to each of the interdigital transducers $T_X$ and $T_Y$, a surface acoustic wave is excited on the upper end surface of the substrate. The surface acoustic wave excited by the interdigital transducer $T_X$ and that excited by the interdigital transducer $T_Y$ are transduced to electric signals $E_{Xi}$ (i=x, ..., 2, 1, 0, −1, −2, ..., −x) and $E_{Yj}$ (j=y, ..., 2, 1, 0, −1, −2, ..., −y), respectively. If touching a crossing point made from the position $F_{Xx}$ and $F_{Yy}$, the electric signals $E_{X-x}$ and $E_{Y-y}$ are delivered from the interdigital transducers $R_X$ and $R_Y$, respectively. The controlling system finds the crossing point by detecting the frequency $f_{X-x}$ of the electric signal $E_{X-x}$ and the frequency $f_{Y-y}$ of the electric signal $E_{Y-y}$, and produces an image on a position, corresponding to the crossing point, on a display panel receiving the electric signals $E_{X-x}$ and $E_{Y-y}$.

12 Claims, 4 Drawing Sheets

ULTRASONIC TOUCH-POSITION SENSITIVE DEVICE

BACKGROUND OF THE INVENTION

1. Field of the Invention.

The present invention relates to an ultrasonic device for sensing a touch-position on a piezoelectric substrate or a nonpiezoelectric plate thereon, and producing an image on a position, corresponding to the touch-position, on a display panel.

2. Description of the Prior Art.

A pointing device used for assisting the role of a keyboard is available as a means of producing an image on a display panel. One of conventional pointing devices is, for example, the device named mouse. When producing an image on a display panel by using the mouse, it is necessary to move the mouse itself on a plane, such as a rubber board, with some extent. Thus, an image based on evaluation with respect to a moving direction and a moving distance of the mouse on the plane is made on the display panel. However, since a point on the plane is not always placed on the corresponding point on the display panel, much of the work the mouse does is wasted. In addition, because of difficulty in controlling the mouse minutely, it often takes much time to produce an image on the display panel.

Thus, conventional pointing devices considerably waste time and energy on producing an image on the display panel, moreover, have the difficulty on realizing a small-sized and simple structure.

SUMMARY OF THE INVENTION

An object of the present invention is to provide an ultrasonic touch-position sensing device capable of specifying a minute touch-position on a piezoelectric substrate or a nonpiezoelectric plate mounted thereon with a high sensitivity and a quick response time.

Another object of the present invention is to provide an ultrasonic touch-position sensing device excellent in manufacturing and mass-production.

A still other object of the present invention is to provide an ultrasonic touch-position sensing device operating under low power consumption with low voltage.

A still further object of the present invention is to provide an ultrasonic touch-position sensing device having a small-sized circuit with a simple structure which is very light in weight.

According to one aspect of the present invention there is provided an ultrasonic touch-position sensing device comprising a piezoelectric substrate having an upper- and a lower end surfaces running perpendicular to the thickness direction thereof, surface acoustic wave transducing units X and Y, and a controlling system comprising a signal controller and being connected with the surface acoustic wave transducing units X and Y. The surface acoustic wave transducing unit X consists of an input interdigital transducer $T_X$, an output interdigital transducer $R_X$ and an amplifier $A_X$, an output terminal of the interdigital transducer $R_X$ being connected with an input terminal of the interdigital transducer $T_X$ via the amplifier $A_X$. The interdigital transducer $T_X$ is formed on the upper end surface of the piezoelectric substrate, and has an interdigital periodicity $P_X$ and an overlap length $L_X$, the thickness of the piezoelectric substrate being larger than three times the interdigital periodicity $P_X$. The interdigital transducer $R_X$ is opposed to the interdigital transducer $T_X$ on the upper end surface of the piezoelectric substrate, and is placed such that the finger direction of the interdigital transducer $R_X$ is slanting to that of the interdigital transducer $T_X$ by an angle a, an interdigital periodicity $P_N$ along the vertical direction to the finger direction of the interdigital transducer $R_X$ being equal to the product of the interdigital periodicity PX and cos α, an overlap length $L_P$ along the finger direction of the interdigital transducer $R_X$ being equal to the product of the overlap length $L_X$ and sec α as well as the product of N times (N=1, 2, . . . , n) the interdigital periodicity $P_X$ and cosec α. The surface acoustic wave transducing unit Y consists of an input interdigital transducer $T_Y$, an output interdigital transducer $R_Y$ and an amplifier $A_Y$, an output terminal of the interdigital transducer $R_Y$ being connected with an input terminal of the interdigital transducer $T_Y$ via the amplifier $A_Y$. The interdigital transducer $T_Y$ is formed on the upper end surface of the piezoelectric substrate and has an interdigital periodicity $P_Y$ and an overlap length $L_Y$, the thickness of the piezoelectric substrate being larger than three times the interdigital periodicity $P_Y$. The interdigital transducer $R_Y$ is opposed to the interdigital transducer $T_Y$ on the upper end surface of the piezoelectric substrate, and is placed such that the finger direction of the interdigital transducer $R_Y$ is slanting to that of the interdigital transducer $T_Y$ by an angle α, an interdigital periodicity $P_N$ along the vertical direction to the finger direction of the interdigital transducer $R_Y$ being equal to the product of the interdigital periodicity $P_Y$ and cos α, an overlap length $L_P$ along the finger direction of the interdigital transducer $R_Y$ being equal to the product of the overlap length $L_Y$ and sec α as well as the product of N times (N=1, 2, . . . , n) the interdigital periodicity $P_Y$ and cosec α.

When an electric signal with a frequency approximately corresponding to the interdigital periodicity $P_X$ is applied to the interdigital transducer $T_X$, a surface acoustic wave is excited on the upper end surface of the piezoelectric substrate, the surface acoustic wave having the wavelength approximately equal to the interdigital periodicity $P_X$. When an electric signal with a frequency approximately corresponding to the interdigital periodicity $P_Y$ is applied to the interdigital transducer $T_Y$, a surface acoustic wave is excited on the upper end surface of the piezoelectric substrate, the surface acoustic wave having the wavelength approximately equal to the interdigital periodicity $P_Y$. The surface acoustic wave excited by the interdigital transducer $T_X$ is transduced at the interdigital transducer $R_X$ to electric signals $E_{Xi}$ (i=x, . . . , 2, 1, 0, -1, -2, . . . , -x) with frequencies $f_{Xi}$ (i=x, . . . , 2, 1, 0, -1, -2, . . . , -x), respectively, the total electric signal $\Sigma E_{Xi}$ made by the electric signals $E_{Xi}$ being zero and not able to be detected at the interdigital transducer $R_X$. The surface acoustic wave excited by the interdigital transducer $T_Y$ is transduced at the interdigital transducer $R_Y$ to electric signals $E_{Yj}$ (j=y, . . . , 2, 1, 0, -1, -2, . . . , -y) with frequencies $f_{Yj}$ (j=y, . . . , 2, 1, 0, -1, -2, . . . , -y), respectively, the total electric signal $\Sigma E_{Yj}$ made by the electric signals $E_{Yj}$ being zero and not able to be detected at the interdigital transducer $R_Y$. The interdigital transducers $T_X$ and $R_X$ form propagation lanes $Z_{Xi}$ (i=x, . . . , 2, 1, 0, -1, -2, . . . , -x) of the surface acoustic wave on the upper end surface of the piezoelectric substrate, a propagation lane $Z_{XO}$ existing on the line not only vertical to the finger direction of the interdigital transducer $T_X$ but also dividing the overlap length $L_X$ of the interdigital transducer $T_X$ into two halves, the propagation lanes $Z_{Xi}$ corresponding to positions $F_{Xi}$ (i=x, . . . , 2, 1, 0, -1, -2, . . . , -x) on the upper end surface of the piezoelectric substrate. The interdigital transducers $T_Y$ and $R_Y$ form propagation lanes $Z_{Yj}$ (j=y, . . . , 2, 1, 0, -1, -2, . . . , -y) of the surface acoustic wave on the upper end surface of the piezoelectric substrate, a propagation lane $Z_{YO}$ existing on the line not only vertical to the finger direction of the interdigital transducer $T_Y$ but also dividing the overlap length $L_Y$ of the interdigital transducer $T_Y$ into two halves, the propagation lanes $Z_{Yj}$ corresponding to positions $F_{Yj}$ (j=y, . . . , 2, 1, 0, −1, −2, . . . , −y) on the upper end surface of the piezoelectric substrate. The propagation lanes $Z_{Xi}$ are vertical to the propagation lanes $Z_{Yj}$.

If touching with a finger or others on a crossing point made from a position $F_{Xx}$ and a position $F_{Yy}$, electric signals $E_{X-x}$ and $E_{Y-y}$ are delivered from the interdigital transducers $R_X$ and $R_Y$, respectively. The controlling system senses a touch on the crossing point by an appearance of the electric signal $E_{X-x}$ at the interdigital transducer $R_X$ and an appearance of the electric signal $E_{Y-y}$ at the interdigital transducer $R_Y$, finds the crossing point by detecting the frequency $f_{X-x}$ of the electric signal $E_{X-x}$ and the frequency $f_{Y-y}$ of the electric signal $E_{Y-y}$, and produces an image on a position, corresponding to the crossing point, on a display panel receiving the electric signal $E_{X-x}$ and the electric signal $E_{Y-y}$.

According to another aspect of the present invention there is provided an interdigital transducer $T_X$ having an interdigital periodicity $P_X$ different from an interdigital periodicity $P_Y$ of an interdigital transducer $T_Y$, the frequency band of the frequencies $f_{Xi}$ being different from the frequency band of the frequencies $f_{Yj}$.

According to another aspect of the present invention there is provided a nonpiezoelectric plate having an upper- and a lower end surfaces running perpendicular to the direction of the thickness d thereof. The thickness d of the nonpiezoelectric plate is smaller than the interdigital periodicities $P_X$ and $P_Y$. The lower end surface of the nonpiezoelectric plate is cemented on the upper end surface of the piezoelectric substrate through the interdigital transducers $T_X$, $R_X$, $T_Y$ and $R_Y$. When an electric signal is applied to each of the interdigital transducers $T_X$ and $T_Y$, a surface acoustic wave of the zeroth mode and the higher order modes is excited on two areas, in contact with the interdigital transducers $T_X$ and $T_Y$, of the upper end surface of the piezoelectric substrate, and is transmitted to two areas, in contact with the interdigital transducers $R_X$ and $R_Y$, of the upper end surface of the piezoelectric substrate, through the nonpiezoelectric plate. The phase velocity of the surface acoustic wave of the zeroth mode is approximately equal to the phase velocity of the Rayleigh wave traveling on the piezoelectric substrate alone under the electrically shorted condition, the phase velocity of the surface acoustic wave of the higher order modes being approximately equal to the phase velocity of the Rayleigh wave traveling on the piezoelectric substrate alone under the electrically opened condition. The nonpiezoelectric plate is made of a material such that the phase velocity of the surface acoustic wave traveling on the nonpiezoelectric plate alone is lower than that traveling on the piezoelectric substrate alone. The interdigital transducers $T_X$ and $R_X$ form propagation lanes $Z_{Xi}$ (i=x, . . . , 2, 1, 0, −1, −2, . . . , −x), and the interdigital transducers $T_Y$ and $R_Y$ form propagation lanes $Z_{Yj}$ (j=y, . . . , 2, 1, 0, −1, −2, . . . , −y) of the surface acoustic wave on the upper end surface of the nonpiezoelectric plate. The propagation lanes $Z_{Xi}$ and $Z_{Yj}$ correspond to positions $F_{Xi}$ (i=x, . . . , 2, 1, 0, −1, −2, . . . , −x) and positions $F_{Yj}$ (j=y, . . . , 2, 1, 0, −1, −2, . . . , −y) on the upper end surface of the nonpiezoelectric plate.

According to another aspect of the present invention there is provided a piezoelectric substrate made of a piezoelectric ceramic, the polarization axis thereof being parallel to the thickness direction thereof.

According to other aspect of the present invention there is provided a controlling system including an antenna, the frequencies $f_{Xi}$ and $f_{Yj}$ being radio frequencies. In this case, the controlling system produces an image on a position, corresponding to the crossing point, on a display panel receiving the electric signal $E_{X-x}$ as a radio wave and the electric signal $E_{Y-y}$ as a radio wave.

According to a further aspect of the present invention there is provided a supporting board cemented to the lower end surface of the piezoelectric substrate.

BRIEF DESCRIPTION OF THE DRAWINGS

Other features and advantages of the invention will be clarified from the following description with reference to the attached drawings.

DETAILED DESCRIPTION OF THE PRESENTLY PREFERRED EXEMPLARY EMBODIMENTS

Figure 1:
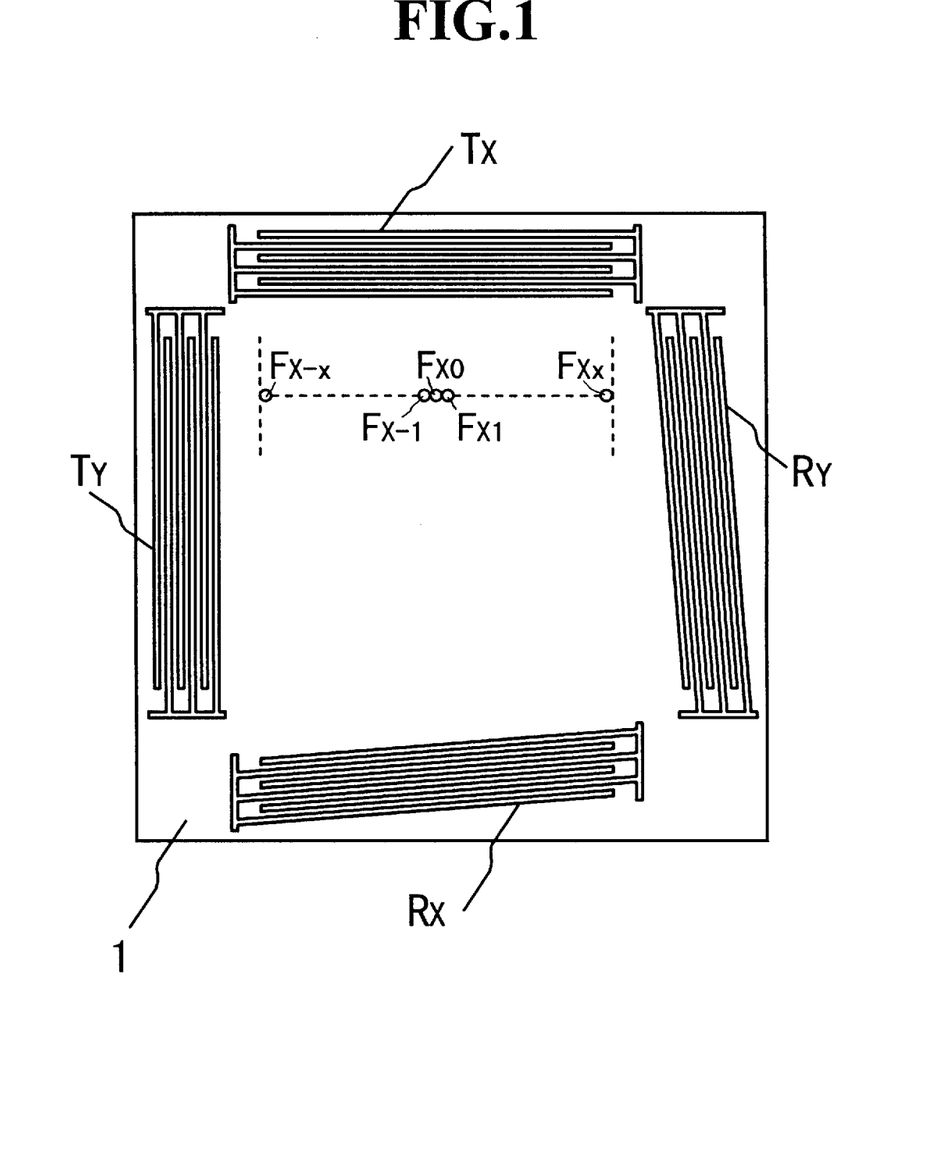
FIG. 1 shows a plan view of an ultrasonic touch-position sensing device according to a first embodiment of the present invention.

FIG. 1 shows a plan view of an ultrasonic touch-position sensing device according to a first embodiment of the present invention. The ultrasonic touch-position sensing device comprises piezoelectric substrate 1 having an upper- and a lower end surfaces running perpendicular to the thickness direction thereof, controlling system 2, surface acoustic wave transducing units X and Y. Surface acoustic wave transducing unit X consists of input interdigital transducer $T_X$ formed on the upper end surface of piezoelectric substrate 1, output interdigital transducer $R_X$ opposed to interdigital transducer $T_X$ on the upper end surface of piezoelectric substrate 1, and amplifier $A_X$. Surface acoustic wave transducing unit Y consists of input interdigital transducer $T_Y$ formed on the upper end surface of piezoelectric substrate 1, output interdigital transducer $R_Y$ opposed to interdigital transducer $T_Y$ on the upper end surface of piezoelectric substrate 1, and amplifier $A_Y$. FIG. 1 shows only piezoelectric substrate 1 made from a piezoelectric ceramic with a dimension of 1.5 mm in thickness, and interdigital transducers ($T_X$, $R_X$, $T_Y$ and $R_Y$) made from aluminium thin film. Interdigital transducer $T_X$ has an interdigital periodicity $P_X$ of 110 μm and an overlap length $L_X$ of 40 mm. Interdigital transducer $T_Y$ has an interdigital periodicity $P_Y$ of 120 μm and an overlap length $L_Y$ of 40 mm. The finger direction of interdigital transducer $R_X$ is not parallel to that of interdigital transducer $T_X$. The finger direction of interdigital transducer $R_Y$ is not parallel to that of interdigital transducer $T_Y$. In the ultrasonic touch-position sensing device in FIG. 1, it is possible to sense a touch with a finger or others on a crossing point made from one of positions $F_{Xi}$ (i=x, . . . , 2, 1, 0, −1, −2, . . . , −x) and one of positions $F_{Yj}$ (j=y, . . . , 2, 1, 0, −1, −2, . . . , −y) on the upper end surface of piezoelectric substrate 1. The positions $F_{Xi}$ are along the finger direction of interdigital transducer $T_X$, and the position $F_{XO}$ is existing on the line not only vertical to the finger direction of interdigital transducer $T_X$ but also dividing the overlap length $L_X$ into two halves. The positions $F_{Yj}$ are along the finger direction of interdigital transducer $T_Y$, and the position $F_{YO}$ is existing on the line not only vertical to the finger direction of interdigital transducer $T_Y$ but also dividing the overlap length $L_Y$ into two halves. FIG. 1 does not show the positions $F_{Yj}$.

Figure 2:
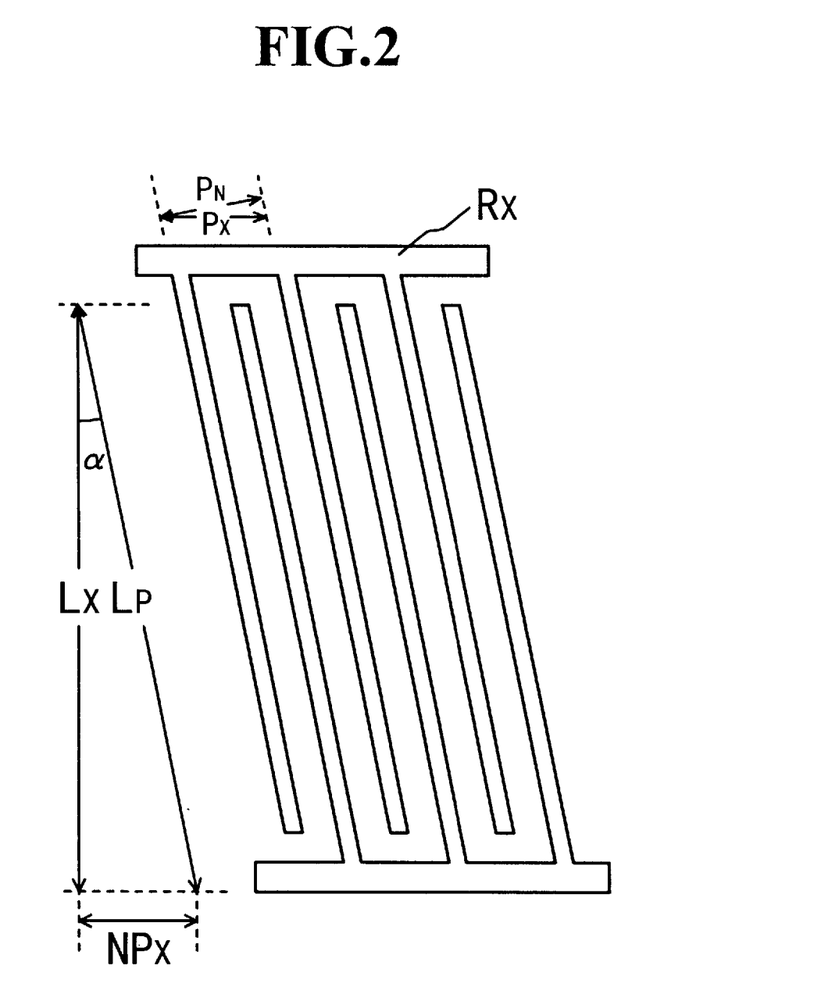
FIG. 2 shows a plan view of interdigital transducer $R_X$.

FIG. 2 shows a plan view of interdigital transducer $R_X$. Interdigital transducer $R_X$ is located such that the finger direction thereof is slanting to that of interdigital transducer $T_X$ by an angle $\alpha$. An interdigital periodicity $P_N$, along the vertical direction to the finger direction of interdigital transducer $R_X$ is equal to the product of the interdigital periodicity $P_X$ and cos $\alpha$. An overlap length $L_P$, along the finger direction of interdigital transducer $R_X$ is equal to the product of the overlap length $L_X$ and sec $\alpha$ as well as the product of N times (N=1, 2, ..., n) the interdigital periodicity $P_X$ and cosec $\alpha$. In the same way, interdigital transducer $R_Y$ is located such that the finger direction thereof is slanting to that of interdigital transducer $T_Y$ by an angle $\alpha$. An interdigital periodicity $P_N$, along the vertical direction to the finger direction of interdigital transducer $R_Y$ is equal to the product of the interdigital periodicity $P_Y$ and cos $\alpha$. An overlap length $L_{Pj}$ along the finger direction of interdigital transducer $R_Y$ is equal to the product of the overlap length $L_Y$ and sec $\alpha$ as well as the product of N times (N=1, 2, ..., n) the interdigital periodicity $P_Y$ and cosec $\alpha$.

Figure 3:
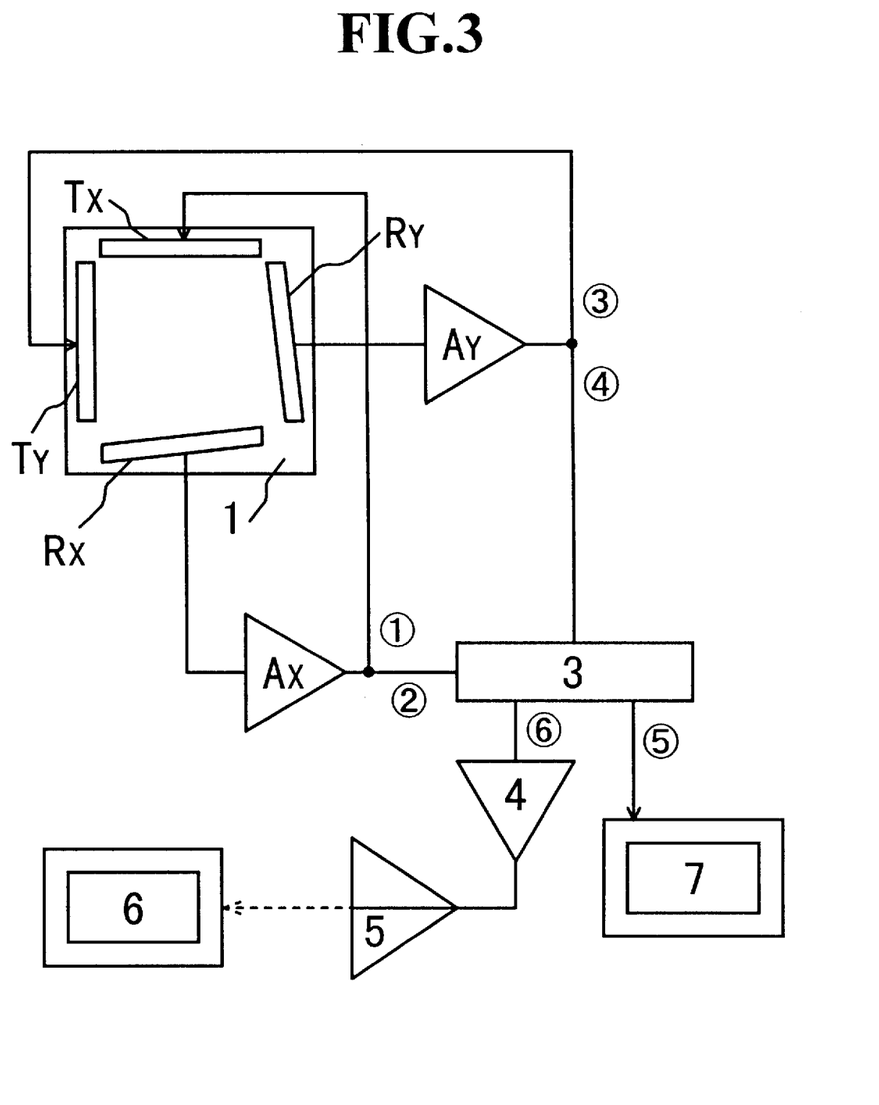
FIG. 3 shows a diagram of a driving circuit of the ultrasonic touch-position sensing device in FIG. 1.

FIG. 3 shows a diagram of a driving circuit of the ultrasonic touch-position sensing device in FIG. 1. Controlling system 2 comprises signal controller 3, amplifier 4 and antenna 5. An output terminal of interdigital transducer $R_X$ is connected with an input terminal of interdigital transducer $T_X$ via amplifier $A_X$. An output terminal of interdigital transducer $R_Y$ is connected with an input terminal of interdigital transducer $T_Y$ via amplifier $A_Y$. When an electric signal having a frequency approximately corresponding to the interdigital periodicity $P_X$ is applied to interdigital transducer $T_X$, the surface acoustic wave having the wavelength approximately equal to the interdigital periodicity $P_X$ is excited on the upper end surface of piezoelectric substrate 1 without a leakage of the surface acoustic wave on the inside of piezoelectric substrate 1, because the thickness of piezoelectric substrate 1 is larger than three times the interdigital periodicity $P_X$. In the same way, when an electric signal having a frequency approximately corresponding to the interdigital periodicity $P_Y$ is applied to interdigital transducer $T_Y$, the surface acoustic wave having the wavelength approximately equal to the interdigital periodicity $P_Y$ is excited on the upper end surface of piezoelectric substrate 1 without a leakage of the surface acoustic wave on the inside of piezoelectric substrate 1, because the thickness of piezoelectric substrate 1 is larger than three times the interdigital periodicity $P_Y$. In addition, because of using a piezoelectric ceramic having the polarization axis parallel to the thickness direction thereof, as piezoelectric substrate 1, both the transducing efficiency from the electric signal applied to interdigital transducer $T_X$ to the surface acoustic wave and the transducing efficiency from the electric signal applied to interdigital transducer $T_Y$ to the surface acoustic wave increase. Thus, it is possible to operate the ultrasonic touch-position sensing device under low power consumption and low voltage.

In the ultrasonic touch-position sensing device in FIG. 1, the surface acoustic wave excited by interdigital transducer $T_X$ is transduced to electric signals $E_{Xi}$ (i=x, ..., 2, 1, 0, -1, -2, ..., -x) with frequencies $f_{Xi}$ (i=x, ..., 2, 1, 0, -1, -2, ..., -x) respectively. The total electric signal $\Sigma E_{Xi}$ made by the electric signals $E_{Xi}$ is zero, therefore it can not be detected at interdigital transducer $R_X$. The surface acoustic wave excited by interdigital transducer $T_Y$ is transduced to electric signals $E_{Yj}$ (j=y, ..., 2, 1, 0, -1, -2, ..., -y) with frequencies $f_{Yj}$ (j=y, ..., 2, 1, 0, -1, -2, ..., -y) respectively. The total electric signal $\Sigma E_{Yj}$ made by the electric signals $E_{Yj}$ is zero, therefore it can not be detected at interdigital transducer $R_Y$. Interdigital transducers $T_X$ and $R_X$ form propagation lanes $Z_{Xi}$ (i=x, ..., 2, 1, 0, -1, -2, ..., -x) of the surface acoustic wave on the upper end surface of piezoelectric substrate 1. The propagation lanes $Z_{Xi}$ correspond to the positions $F_{Xi}$, the propagation lane $Z_{XO}$ corresponding to the position $F_{XO}$. Interdigital transducers $T_Y$ and $R_Y$ form propagation lanes $Z_{Yj}$ (j=y, ..., 2, 1, 0, -1, -2, ..., -y) of the surface acoustic wave on the upper end surface of piezoelectric substrate 1. The propagation lanes $Z_{Yj}$ correspond to the positions $F_{Yj}$, the propagation lane $Z_{YO}$ corresponding to the position $F_{YO}$. The propagation lanes $Z_{Xi}$ are vertical to the propagation lanes $Z_{Yj}$. If touching nowhere on the upper end surface of piezoelectric substrate 1, both the total electric signal $\Sigma E_{Xi}$ transduced from the surface acoustic wave at interdigital transducer $R_X$ and the total electric signal $\Sigma E_{Yj}$ transduced from the surface acoustic wave at interdigital transducer $R_Y$ are zero. However, if touching with a finger or others on a crossing point made from, for example, the positions $F_{X3}$ and $F_{Y-7}$, the electric signals $E_{X-3}$ and $E_{Y7}$ are delivered from interdigital transducers $R_X$ and $R_Y$, respectively, because only the surface acoustic wave on the propagation lane $Z_{X3}$ out of the propagation lanes $Z_{Xi}$ and only the surface acoustic wave on the propagation lane $Z_{Y-7}$ out of the propagation lanes $Z_{Yj}$ are disappeared, and are not transduced to the electric signal $E_{X3}$ at interdigital transducer $R_X$ and to the electric signal $E_{Y-7}$ at interdigital transducer $R_Y$, respectively. Accordingly, the electric signal $E_{X-3}$ ($\Sigma E_{Xi} - E_{X3} = E_{X-3}$) is delivered from interdigital transducer $R_X$, and the electric signal $E_{Y7}$ ($\Sigma E_{Yj} - E_{Y-7} = E_{Y7}$) is delivered from interdigital transducer $R_Y$. Thus, the electric signals $E_{X-x}$ and $E_{Y-y}$ are delivered from interdigital transducers $R_X$ and $R_Y$, respectively, only when touching on a crossing point made from the positions $F_{Xx}$ and $F_{Yy}$, causing a low voltage operation and low power consumption.

In the driving circuit in FIG. 3, the electric signal $E_{X-x}$ is amplified by amplifier $A_X$, an electric signal ① being applied to interdigital transducer $T_X$, an electric signal ② being applied to signal controller 3. The electric signal $E_{Y-y}$ is amplified by amplifier $A_Y$, an electric signal ③ being applied to interdigital transducer $T_Y$, an electric signal ④ being applied to signal controller 3. Thus, interdigital transducers $T_X$ and $R_X$, a propagation lane, as a delay element, of the surface acoustic wave between interdigital transducers $T_X$ and $R_X$, and amplifier $A_X$ form an oscillator, at the same time, interdigital transducers $T_Y$ and $R_Y$, a propagation lane, as a delay element, of the surface acoustic wave between interdigital transducers $T_Y$ and $R_Y$, and amplifier $A_Y$ form an oscillator, causing not only a low voltage operation and low power consumption, but also a small-sized circuit with a simple structure.

Signal controller 3 finds the crossing point made from the positions $F_{Xx}$ and $F_{Yy}$ by detecting the frequency $f_{x-x}$ of the electric signal $E_{X-x}$ and the frequency $f_{Y-y}$ of the electric signal $E_{Y-y}$. All the electric signals ② and ④ applied to signal controller 3 are delivered as an electric signal ⑤ being able to be applied to display panel 7 directly, or delivered as an electric signal ⑥ being able to be amplified by amplifier 4 and then transmitted to display panel 6 as a radio wave via antenna 5. Thus, it is possible to produce an image on a position, corresponding to the crossing point made from the positions $F_{Xx}$ and $F_{Yy}$, on display panel 6 or on display panel 7. In this time, a difference between the interdigital periodicities $P_X$ and $P_Y$ makes a difference between a frequency band of the frequencies $f_{Xi}$ and that of the frequencies $f_{Yj}$. As a result, a difference between the frequencies $f_{Xx}$ and $f_{Yy}$ causes a small-sized circuit with a simple structure in the ultrasonic touch-position sensing device, In addition, when both the frequencies $f_{Xi}$ and $f_{Yj}$ are radio frequencies, controlling system 2 can produce an image on a position, corresponding to the crossing point, on display panel 6 receiving the electric signal $E_{X-x}$ as a radio wave and the electric signal $E_{Y-y}$ as a radio wave. In other words, controlling system 2 enables a remote control for producing an image on display panel 6.

When touching from a crossing point to a crossing point continuously on the upper end surface of piezoelectric substrate 1, for example, from the crossing point made by the positions $F_{X4}$ and $F_{Y2}$ to the crossing point made by the positions $F_{X5}$ and $F_{Y5}$ continuously, a ratio of a difference between the positions $F_{Y2}$ and $F_{Y5}$ to a difference between the positions $F_{X4}$ and $F_{X5}$ is three. Therefore, it is possible to produce an image corresponding to a line (y=3X) on display panel 6 or on display panel 7, the beginning point of the line on display panel 6 or on display panel 7 corresponding to the crossing point made by the positions $F_{X4}$ and $F_{Y2}$, and the end point of the line on display panel 6 or on display panel 7 corresponding to the crossing point made by the positions $F_{X5}$ and $F_{Y5}$. Thus, it is possible, on display panel 6 or on display panel 7, to produce an image such as a character, a mark, a diagram and so on, in addition, to move an arrow toward a favorite direction at a favorite distance as time goes on.

Figure 4:
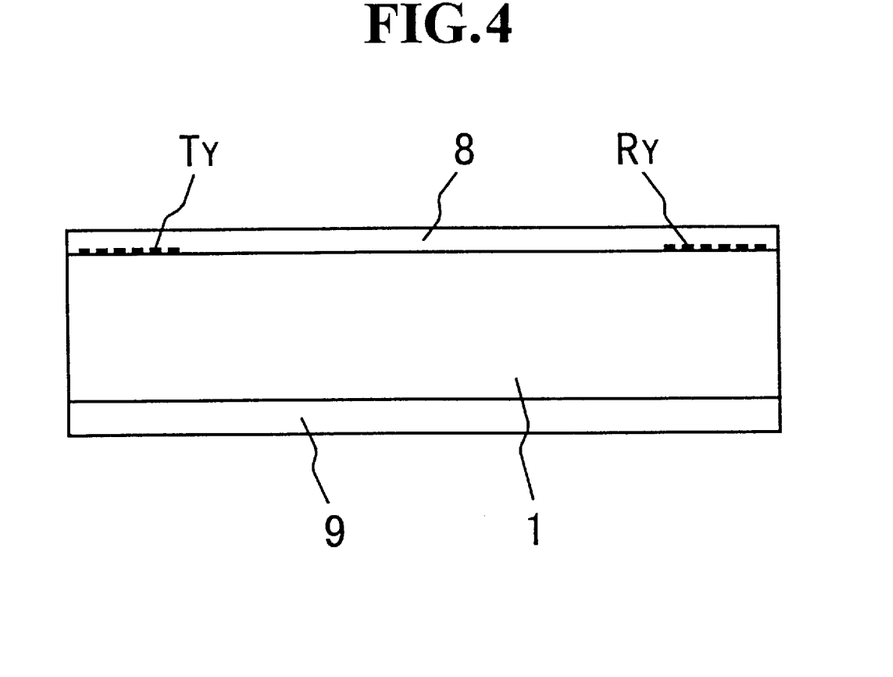
FIG. 4 shows a sectional view of an ultrasonic touch-position sensing device according to a second embodiment of the present invention.

FIG. 4 shows a sectional view of an ultrasonic touch-position sensing device according to a second embodiment of the present invention. The ultrasonic touch-position sensing device comprises the device of the first embodiment, and in addition, nonpiezoelectric plate 8 having an upper- and a lower end surfaces running perpendicular to the direction of the thickness d thereof, and supporting board 9 cemented to the lower end surface of piezoelectric substrate 1. FIG. 4 shows only piezoelectric substrate 1, nonpiezoelectric plate 8, supporting board 9 and interdigital transducers $T_Y$ and $R_Y$. Non piezoelectric plate 8, made from a glass or a polymer such as acrylate resin, teflon and plastic material, has a dimension of 100 μm in thickness and is cemented on the upper end surface of piezoelectric substrate 1 through interdigital transducers $T_X$, $R_X$, $T_Y$ and $R_Y$. When nonpiezoelectric plate 8 is made from a glass, the glass is cemented on the upper end surface of piezoelectric substrate 1 through an epoxy resin with a thickness of about 20 μm. When nonpiezoelectric plate 8 is made from a polymer, all over the upper end surface of piezoelectric substrate 1 is coated with the polymer directly.

In case of driving the ultrasonic touch-position sensing device in FIG. 4, the driving circuit in FIG. 3 is available. When an electric signal having a frequency approximately corresponding to the interdigital periodicity $P_X$ is applied to interdigital transducer $T_X$, the surface acoustic wave, of the zeroth mode and the higher order modes, having the wavelength approximately equal to the interdigital periodicity $P_X$ is excited on an area, in contact with interdigital transducer $T_X$, of the upper end surface of piezoelectric substrate 1. In the same way, when an electric signal having a frequency approximately corresponding to the interdigital periodicity $P_Y$ is applied to interdigital transducer $T_Y$, the surface acoustic wave, of the zeroth mode and the higher order modes, having the wavelength approximately equal to the interdigital periodicity $P_Y$ is excited on an area, in contact with interdigital transducer $T_Y$, of the upper end surface of piezoelectric substrate 1. In this time, if the phase velocity of the zeroth mode surface acoustic wave is approximately equal to the phase velocity of the Rayleigh wave traveling on piezoelectric substrate 1 alone under electrically shorted condition, and the phase velocity of the higher order mode surface acoustic wave is approximately equal to the phase velocity of the Rayleigh wave traveling on piezoelectric substrate 1 alone under electrically opened condition, the transducing efficiency from the electric signal to the surface acoustic wave increases, and in addition, the reflection caused by the miss-matching on the acoustic impedance at the boundary surface between piezoelectric substrate 1 and nonpiezoelectric plate 8 never causes. Moreover, since piezoelectric substrate 1 is made from a piezoelectric ceramic having the polarization axis parallel to the thickness direction thereof, the surface acoustic wave is excited on the area, in contact with interdigital transducer $T_X$, of the upper end surface of piezoelectric substrate 1 effectively, as well as on the area, in contact with interdigital transducer $T_Y$, of the upper end surface of piezoelectric substrate 1 effectively. The surface acoustic wave is transmitted to the upper end surface of nonpiezoelectric plate 8. As the thickness of piezoelectric substrate 1 is larger than three times not only the interdigital periodicity $P_X$ but also the interdigital periodicity $P_Y$, and the thickness d of nonpiezoelectric plate 8 is smaller than not only the interdigital periodicity $P_X$ but also the interdigital periodicity $P_Y$, it is possible to increase the transmitting efficiency of the surface acoustic wave from the upper end surface of piezoelectric substrate 1 to the upper end surface of nonpiezoelectric plate 8, as well as to support the lower end surface of piezoelectric substrate 1 by supporting board 9 directly. In addition, if using a material, as nonpiezoelectric plate 8, such that the phase velocity of the surface acoustic wave traveling on nonpiezoelectric plate 8 alone is lower than that traveling on piezoelectric substrate 1 alone, it is possible to increase the transmitting efficiency of the surface acoustic wave from the upper end surface of piezoelectric substrate 1 to the upper end surface of nonpiezoelectric plate 8 without a leakage of the surface acoustic wave on the inside of piezoelectric substrate 1. Thus, it is possible to operate the ultrasonic touch-position sensing device under low power consumption and low voltage, and in addition, it is possible to support the lower end surface of piezoelectric substrate 1 by supporting board 9 directly.

In the ultrasonic touch-position sensing device in FIG. 4, the surface acoustic wave excited by interdigital transducer $T_X$ is transmitted to an area, in contact with interdigital transducer $R_X$, of the upper end surface of piezoelectric substrate 1 through nonpiezoelectric plate 8, and is transduced to electric signals $E_{Xi}$ (i=x, . . . , 2, 1, 0, -1, -2, . . . , -x) with frequencies $f_{Xi}$ (i=x, . . . , 2, 1, 0, -1, -2, . . . -x) respectively, the total electric signal $\Sigma E_{Xi}$ made by the electric signals $E_{Xi}$ being zero and not able to be detected at interdigital transducer $R_X$. The surface acoustic wave excited by interdigital transducer $T_Y$ is transmitted to an area, in contact with interdigital transducer $R_Y$, of the upper end surface of piezoelectric substrate 1 through nonpiezoelectric plate 8, and is transduced to electric signals $E_{Yj}$ (j=y, . . . , 2, 1, 0, -1, -2, . . . -y) with frequencies $f_{Yj}$ (j=y, . . . , 2, 1, 0, -1, -2 . . . , -y) respectively, the total electric signal $\Sigma E_{Yj}$ made by the electric signals $E_{Yj}$ being zero and not able to be detected at interdigital transducer $R_Y$. Interdigital transducers $T_X$ and $R_X$ form propagation lanes $Z_{Xi}$ (i=x, . . . , 2, 1, 0, -1, -2, . . . , -x) of the surface acoustic wave on the upper end surface of nonpiezoelectric plate 9. The propagation lanes $Z_{Xi}$ correspond to the positions $F_{Xi}$ (i=x, . . . , 2, 1, 0, -1, -2, . . . , -x) on the upper end surface of nonpiezoelectric plate 9, the propagation lane $Z_{XO}$ corresponding to the position $F_{XO}$. Interdigital transducers $T_Y$ and $R_Y$ form propagation lanes $Z_{Yj}$ (j=y, ..., 2, 1, 0, -1, -2, ..., -y) of the surface acoustic wave on the upper end surface of nonpiezoelectric plate 8. The propagation lanes $Z_{Yj}$ correspond to the positions $F_{Yj}$ (j=y, ..., 2, 1, 0, -1, -2, ..., -y) on the upper end surface of nonpiezoelectric plate 8, the propagation lane $Z_{YO}$ corresponding to the position $F_{YO}$. If touching with a finger or others on a crossing point made from the positions $F_{Xx}$ and $F_{Yy}$, the electric signals $E_{X-x}$ and $E_{Y-y}$ are delivered from interdigital transducers $R_X$ and $R_Y$, respectively. Controlling system 2 finds the crossing point by detecting the frequency $f_{X-x}$ of the electric signal $E_{X-x}$ and the frequency $f_{Y-y}$ of the electric signal $E_{Y-y}$, and produces an image on a position, corresponding to the crossing point, of display panel 6 or display panel 7.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. An ultrasonic touch-position sensing device comprising:

a piezoelectric substrate having an upper- and a lower end surfaces running perpendicular to the thickness direction thereof;

a surface acoustic wave transducing unit X consisting of
an input interdigital transducer $T_X$ formed on said upper end surface of said piezoelectric substrate and having an interdigital periodicity $P_X$ and an overlap length $L_X$, the thickness of said piezoelectric substrate being larger than three times said interdigital periodicity $P_X$, an output interdigital transducer $R_X$ opposed to said interdigital transducer $T_X$ on said upper end surface of said piezoelectric substrate and placed such that the finger direction of said interdigital transducer $R_X$ is slanting to that of said interdigital transducer $T_X$ by an angle $\alpha$, an interdigital periodicity $P_N$ along the vertical direction to the finger direction of said interdigital transducer $R_X$ being equal to the product of said interdigital periodicity $P_X$ and cos $\alpha$, an overlap length $L_P$ along the finger direction of said interdigital transducer $R_X$ being equal to the product of said overlap length $L_X$ and sec $\alpha$ as well as the product of N times (N=1, 2, ..., n) said interdigital periodicity $P_X$ and cosec $\alpha$, and an amplifier $A_X$, an output terminal of said interdigital transducer $R_X$ being connected with an input terminal of said interdigital transducer $T_X$ via said amplifier $A_X$;

a surface acoustic wave transducing unit Y consisting of
an input interdigital transducer $T_Y$ formed on said upper end surface of said piezoelectric substrate and having an interdigital periodicity $P_Y$ and an overlap length $L_Y$, the thickness of said piezoelectric substrate being larger than three times said interdigital periodicity $P_Y$, an output interdigital transducer $R_Y$ opposed to said interdigital transducer $T_Y$ on said upper end surface of said piezoelectric substrate and placed such that the finger direction of said interdigital transducer $R_Y$ is slanting to that of said interdigital transducer $T_Y$ by an angle $\alpha$, an interdigital periodicity $P_N$ along the vertical direction to the finger direction of said interdigital transducer $R_Y$ being equal to the product of said interdigital periodicity $P_Y$ and cos $\alpha$, an overlap length $L_P$ along the finger direction of said interdigital transducer $R_Y$ being equal to the product of said overlap length $L_Y$ and sec $\alpha$ as well as the product of N times (N=1, 2, ..., n) said interdigital periodicity $P_Y$ and cosec $\alpha$, and an amplifier $A_Y$, an output terminal of said interdigital transducer $R_Y$ being connected with an input terminal of said interdigital transducer $T_Y$ via said amplifier $A_Y$; and a controlling system comprising a signal controller and being connected with said surface acoustic wave transducing units X and Y, said interdigital transducer $T_X$ receiving an electric signal with a frequency approximately corresponding to said interdigital periodicity $P_X$, and exciting a surface acoustic wave on said upper end surface of said piezoelectric substrate, said surface acoustic wave having the wavelength approximately equal to said interdigital periodicity $P_X$, said interdigital transducer $T_Y$ receiving an electric signal with a frequency approximately corresponding to said interdigital periodicity $P_Y$, and exciting a surface acoustic wave on said upper end surface of said piezoelectric substrate, said surface acoustic wave having the wavelength approximately equal to said interdigital periodicity $P_Y$, said interdigital transducer $R_X$ transducing said surface acoustic wave excited by said interdigital transducer $T_X$ to electric signals $E_{Xi}$ (i=x, ..., 2, 1, 0, -1, -2, ..., -x) with frequencies $f_{Xi}$ (i=x ..., 2, 1, 0, -1, -2, ..., -x) respectively, the total electric signal $\Sigma E_{Xi}$ made by said electric signals $E_{Xi}$ being zero and not able to be detected at said interdigital transducer $R_X$, said interdigital transducer $R_Y$ transducing said surface acoustic wave excited by said interdigital transducer $T_Y$ to electric signals $E_{Yj}$ (j=y, ..., 2, 1, 0, -1, -2, ..., -y) with frequencies $f_{Yj}$ (j=y ..., 2, 1, 0, -1, -2, ..., -y) respectively, the total electric signal $\Sigma E_{Yj}$ made by said electric signals $E_{Yj}$ being zero and not able to be detected at said interdigital transducer $R_Y$, said interdigital transducers $T_X$ and $R_X$ forming propagation lanes $Z_{Xi}$ (i=x, ..., 2, 1, 0, -1, -2, ..., -x) of the surface acoustic wave on said upper end surface of said piezoelectric substrate, a propagation lane $Z_{XO}$ existing on the line not only vertical to the finger direction of said interdigital transducer $T_X$ but also dividing the overlap length $L_X$ of said interdigital transducer $T_X$ into two halves, said propagation lanes $Z_{Xi}$ corresponding to positions $F_{Xi}$ (i=x, ..., 2, 1, 0, -1, -2, ..., -x) on said upper end surface of said piezoelectric substrate, said interdigital transducers $T_Y$ and $R_Y$ forming propagation lanes $Z_{Yj}$ (j=y, ..., 2, 1, 0, -1, -2, ..., -y) of the surface acoustic wave on said upper end surface of said piezoelectric substrate, a propagation lane $Z_{YO}$ existing on the line not only vertical to the finger direction of said interdigital transducer $T_Y$ but also dividing the overlap length $L_Y$ of said interdigital transducer $T_Y$ into two halves, said propagation lanes $Z_{Yj}$ corresponding to positions $F_{Yj}$ (j=y, ..., 2, 1, 0, -1, -2, ..., -y) on said upper end surface of said piezoelectric substrate, said controlling system sensing a touch with a finger or others on a crossing point made from a position $F_{Xx}$ and a position $F_{Y_y}$ by an appearance of an electric signal $E_{X_{-x}}$ at said interdigital transducer $R_X$ and an appearance of an electric signal $E_{Y_{-y}}$ at said interdigital transducer $R_Y$, finding said crossing point by detecting the frequency $f_{X_{-x}}$ of said electric signal $E_{X_{-x}}$ and the frequency $f_{Y_{-y}}$ of said electric signal $E_{Y_{-y}}$, and producing an image on a position, corresponding to said crossing point, on a display panel receiving said electric signal $E_{X_{-x}}$ and said electric signal $E_{Y_{-y}}$.

2. An ultrasonic touch-position sensing device as defined in claim 1, wherein said interdigital periodicity $P_X$ is different from said interdigital periodicity $P_Y$, the frequency band of said frequencies $f_{Xi}$ being different from the frequency band of said frequencies $f_{Yj}$.

3. An ultrasonic touch-position sensing device as defined in claim 1, wherein said propagation lanes $Z_{Xi}$ are vertical to said propagation lanes $Z_{Yj}$.

4. An ultrasonic touch-position sensing device as defined in claim 1, wherein said piezoelectric substrate is made of a piezoelectric ceramic, the polarization axis thereof being parallel to the thickness direction thereof.

5. An ultrasonic touch-position sensing device as defined in claim 1, wherein said controlling system further comprising an antenna, said interdigital periodicity $P_X$ being different from said interdigital periodicity $P_Y$, the frequency band of said frequencies $f_{Xi}$ being different from the frequency band of said frequencies $f_{Yj}$, said frequencies $f_{Xi}$ and $f_{Yj}$ being radio frequencies, said controlling system producing an image on a position, corresponding to said crossing point, on a display panel receiving said electric signal $E_{X_{-x}}$ as a radio wave and said electric signal $E_{Y_{-y}}$ as a radio wave.

6. An ultrasonic touch-position sensing device as defined in claim 1 further comprising a supporting board cemented to said lower end surface of said piezoelectric substrate.

7. An ultrasonic touch-position sensing device comprising:

a piezoelectric substrate having an upper- and a lower end surfaces running perpendicular to the thickness direction thereof;

a nonpiezoelectric plate having an upper- and a lower end surfaces running perpendicular to the direction of the thickness d thereof;

a surface acoustic wave transducing unit X consisting of an input interdigital transducer $T_X$ formed on said upper end surface of said piezoelectric substrate and having an interdigital periodicity $P_X$ and an overlap length $L_X$, the thickness of said piezoelectric substrate being larger than three times said interdigital periodicity $P_X$, said thickness d of said nonpiezoelectric plate being smaller than said interdigital periodicity $P_X$, an output interdigital transducer $R_X$ opposed to said interdigital transducer $T_X$ on said upper end surface of said piezoelectric substrate and placed such that the finger direction of said interdigital transducer $R_X$ is slanting to that of said interdigital transducer $T_X$ by an angle $\alpha$, an interdigital periodicity $P_N$ along the vertical direction to the finger direction of said interdigital transducer $R_X$ being equal to the product of said interdigital periodicity $P_X$ and cos $\alpha$, an overlap length $L_P$ along the finger direction of said interdigital transducer $R_X$ being equal to the product of said overlap length $L_X$ and sec $\alpha$ as well as the product of N times (N=1, 2, . . . , n) said interdigital periodicity $P_X$ and cosec $\alpha$, and an amplifier $A_X$, an output terminal of said interdigital transducer $R_X$ being connected with an input terminal of said interdigital transducer $T_X$ via said amplifier $A_X$;

a surface acoustic wave transducing unit Y consisting of an input interdigital transducer $T_Y$ formed on said upper end surface of said piezoelectric substrate and having an interdigital periodicity $P_Y$ and an overlap length $L_Y$, the thickness of said piezoelectric substrate being larger than three times said interdigital periodicity $P_Y$, said thickness d of said nonpiezoelectric plate being smaller than said interdigital periodicity $P_Y$, an output interdigital transducer $R_Y$ opposed to said interdigital transducer $T_Y$ on said upper end surface of said piezoelectric substrate and placed such that the finger direction of said interdigital transducer $R_Y$ is slanting to that of said interdigital transducer $T_Y$ by an angle $\alpha$, an interdigital periodicity $P_N$ along the vertical direction to the finger direction of said interdigital transducer $R_Y$ being equal to the product of said interdigital periodicity $P_Y$ and cos $\alpha$, an overlap length $L_P$ along the finger direction of said interdigital transducer $R_Y$ being equal to the product of said overlap length $L_Y$ and sec $\alpha$ as well as the product of N times (N=1, 2, . . . , n) said interdigital periodicity $P_Y$ and cosec $\alpha$, said lower end surface of said nonpiezoelectric plate being cemented on said upper end surface of said piezoelectric substrate through said interdigital transducers $T_X$, $R_X$, $T_Y$ and $R_Y$, and an amplifier $A_Y$, an output terminal of said interdigital transducer $R_Y$ being connected with an input terminal of said interdigital transducer $T_Y$ via said amplifier $A_Y$; and a controlling system comprising a signal controller and being connected with said surface acoustic wave transducing units X and Y, said interdigital transducer $T_X$ receiving an electric signal with a frequency approximately corresponding to said interdigital periodicity $P_X$, exciting a surface acoustic wave of the zeroth mode and the higher order modes on an area, in contact with said interdigital transducer $T_X$, of said upper end surface of said piezoelectric substrate, and transmitting said surface acoustic wave having the wavelength approximately equal to said interdigital periodicity $P_X$ to an area, in contact with said interdigital transducer $R_X$, of said upper end surface of said piezoelectric substrate, through said nonpiezoelectric plate, the phase velocity of said surface acoustic wave of said zeroth mode being approximately equal to the phase velocity of the Rayleigh wave traveling on said piezoelectric substrate alone under the electrically shorted condition, the phase velocity of said surface acoustic wave of said higher order modes being approximately equal to the phase velocity of the Rayleigh wave traveling on said piezoelectric substrate alone under the electrically opened condition, said interdigital transducer $T_Y$ receiving an electric signal with a frequency approximately corresponding to said interdigital periodicity $P_Y$, exciting a surface acoustic wave of the zeroth mode and the higher order modes on an area, in contact with said interdigital transducer $T_Y$, of said upper end surface of said piezoelectric substrate, and transmitting said surface acoustic wave having the wavelength approximately equal to said interdigital periodicity $P_Y$ to an area, in contact with said interdigital transducer $R_Y$, of said upper end surface of said piezoelectric substrate, through said nonpiezoelectric plate, the phase velocity of said surface acoustic wave of said zeroth mode being approximately equal to the phase velocity of the Rayleigh wave traveling on said piezoelectric substrate alone under the electrically shorted condition, the phase velocity of said surface acoustic wave of said higher order modes being approximately equal to the phase velocity of the Rayleigh wave traveling on said piezoelectric substrate alone under the electrically opened condition, said interdigital transducer $R_X$ transducing said surface acoustic wave excited by said interdigital transducer $T_X$ to electric signals $E_{Xi}$ (i=x, ..., 2, 1, 0, −1, −2, ..., −x) with frequencies $f_{Xi}$ (i=x, ..., 2, 1, 0, −1, −2, ..., −x) respectively, the total electric signal $\Sigma E_{Xi}$ made by said electric signals $E_{Xi}$ being zero and not able to be detected at said interdigital transducer $R_X$, said interdigital transducer $R_Y$ transducing said surface acoustic wave excited by said interdigital transducer $T_Y$ to electric signals $E_{Yj}$ (j=y, ..., 2, 1, 0, −1, −2, ..., −y) with frequencies $f_{Yj}$ (j=y, ..., 2, 1, 0, −1, −2, ..., −y) respectively, the total electric signal $\Sigma E_{Yj}$ made by said electric signals $E_{Yj}$ being zero and not able to be detected at said interdigital transducer $R_Y$, said nonpiezoelectric plate being made of a material such that the phase velocity of the surface acoustic wave traveling on said nonpiezoelectric plate alone is lower than that traveling on said piezoelectric substrate alone, said interdigital transducers $T_X$ and $R_X$ forming propagation lanes $Z_{Xi}$ (i=x, ..., 2, 1, 0, −1, −2, ..., −x) of the surface acoustic wave on said upper end surface of said nonpiezoelectric plate, a propagation lane $Z_{XO}$ existing on the line not only vertical to the finger direction of said interdigital transducer $T_X$ but also dividing the overlap length $L_X$ of said interdigital transducer $T_X$ into two halves, said propagation lanes $Z_{Xi}$ corresponding to positions $F_{Xi}$ (i=x, ..., 2, 1, 0, −1, −2, ..., −x) on said upper end surface of said nonpiezoelectric plate, said interdigital transducers $T_Y$ and $R_Y$ forming propagation lanes $Z_{Yj}$ (j=y, ..., 2, 1, 0, −1, −2, ... −y) of the surface acoustic wave on said upper end surface of said nonpiezoelectric plate, a propagation lane $Z_{YO}$ existing on the line not only vertical to the finger direction of said interdigital transducer $T_Y$ but also dividing the overlap length $L_Y$ of said interdigital transducer $T_Y$ into two halves, said propagation lanes $Z_{Yj}$ corresponding to positions $F_{Yj}$ (j=y, ..., 2, 1, 0, −1, −2, ..., −y) on said upper end surface of said nonpiezoelectric plate, said controlling system sensing a touch with a finger or others on a crossing point made from a position $F_{Xx}$ and a position $F_{Yy}$ by an appearance of an electric signal $E_{X-x}$ at said interdigital transducer $R_X$ and an appearance of an electric signal $E_{Y-y}$ at said interdigital transducer $R_Y$, finding said crossing point by detecting the frequency $f_{X-x}$ of said electric signal $E_{X-x}$ and the frequency $f_{Y-y}$ of said electric signal $E_{Y-y}$, and producing an image on a position, corresponding to said crossing point, on a display panel receiving said electric signal $E_{X-x}$ and said electric signal $E_{Y-y}$.

8. An ultrasonic touch-position sensing device as defined in claim 7, wherein said interdigital periodicity $P_X$ is different from said interdigital periodicity $P_Y$, the frequency band of said frequencies $f_{Xi}$ being different from the frequency band of said frequencies $f_{Yj}$.

9. An ultrasonic touch-position sensing device as defined in claim 7, wherein said propagation lanes $Z_{Xi}$ are vertical to said propagation lanes $Z_{Yj}$.

10. An ultrasonic touch-position sensing device as defined in claim 7, wherein said piezoelectric substrate is made of a piezoelectric ceramic, the polarization axis thereof being parallel to the thickness direction thereof.

11. An ultrasonic touch-position sensing device as defined in claim 7, wherein said controlling system further comprising an antenna, said interdigital periodicity $P_X$ being different from said interdigital periodicity $P_Y$, the frequency band of said frequencies $f_{Xi}$ being different from the frequency band of said frequencies $f_{Yj}$, said frequencies $f_{Xi}$ and $f_{Yj}$ being radio frequencies, said controlling system producing an image on a position, corresponding to said crossing point, on a display panel receiving said electric signal $E_{X-x}$ as a radio wave and said electric signal $E_{Y-y}$ as a radio wave.

12. An ultrasonic touch-position sensing device as defined in claim 7 further comprising a supporting board cemented to said lower end surface of said piezoelectric substrate.

* * * * *